Dec. 11, 1923.  R. F. CATALDO  1,477,425
TIRE
Filed June 26, 1922
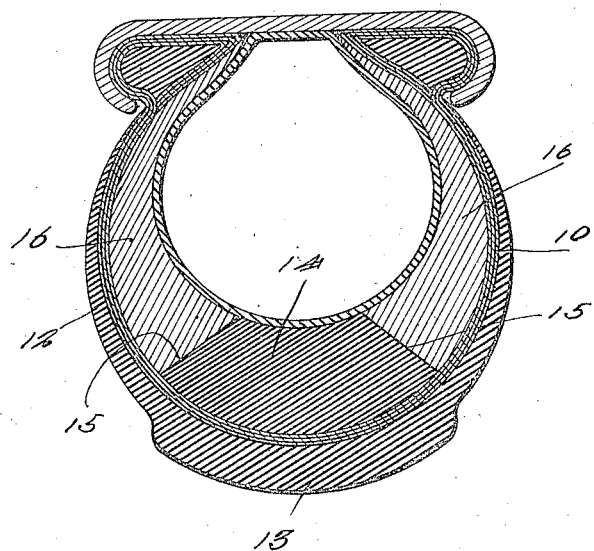

Patented Dec. 11, 1923.

1,477,425

UNITED STATES PATENT OFFICE.

RALPH FRED CATALDO, OF CHELSEA, MASSACHUSETTS.

TIRE.

Application filed June 26, 1922. Serial No. 570,795.

*To all whom it may concern:*

Be it known that I, RALPH FRED CATALDO, a citizen of the United States, residing at Chelsea, in the county of Suffolk and State of Massachusetts, have invented new and useful Improvements in Tires (Case B), of which the following is a specification.

This invention relates to improvements in pneumatic tires and has for an object the provision of a tire casing which will be practically puncture-proof, will resist blow outs and rim cuts and will thus provide a tire having a greatly increased life.

For this purpose, the invention comprises a tire having a novel form of lining which includes a central circumferential cushioning strip of highly compressible material (such as Pará rubber) and tapered side walls formed from a strong and durable, yieldable material, the side walls extending from the opposite side edges of the strip. The circumferential strip provides an increased thickness of cushioning material which will resist puncture and blow outs without reducing the resilient qualities of the tire, while the side walls of the lining act to prevent rim cuts.

With the above and other objects in view, the invention further includes the following novel features and details of construction, to be hereinafter more fully described, illustrated in the accompanying drawing and pointed out in the appended claims.

In the drawing the figure shown represents a transverse section of a tire constructed in accordance with the invention.

Referring more specifically to the drawing, wherein like characters of reference denote corresponding parts, the tire is illustrated as comprising a casing formed of a plurality of layers of fabric indicated at 10, the said fabric being provided with an outer covering of rubber as shown at 12 which is thickened at the tread portion 13, as is usual in tires of this character. The tire may be either of the straight side or clincher type, the latter being illustrated.

The novelty of the invention resides in the lining casing. This lining is formed of a circumferentially arranged, relatively thick strip of highly compressible or yieldable rubber 14 (such as Pará rubber). This strip 14 has its sides beveled as at 15 and extending from the strip upon opposite sides thereof are tapered walls 16. These walls are formed of a strong, durable material of any suitable character and with the strip 14 provide a casing lining which is thickest within the tread of the tire and which tapers toward the rim engaging portion, the side walls 16 reinforcing the casing in a manner to resist rim cuts and blow outs. Due to the thickness and character of the lining, the tire will be rendered practically puncture-proof and at the same time the resilient character of the tire will not be reduced.

The invention is susceptible of various changes in its form, proportions and minor details of construction and the right is herein reserved to make such changes as properly fall within the scope of the appended claims.

Having described the invention what is claimed is:—

1. A tire liner comprising a relatively thick compressible strip of V-shape in cross section and having its opposite sides bevelled and adapted to be interposed between a pneumatic tire and its shoe at the crest thereof, and tapered side walls arranged between the pneumatic tire and tread and disposed against the bevelled surfaces of the strip.

2. A tire liner comprising a V-shape in cross section circumferential member and side walls arranged upon opposite sides of the member and each having one end cut at an angle to coincide with the divergent faces of the member.

In testimony whereof I affix my signature.

RALPH FRED CATALDO.